(No Model.)
M. BRAY.
DIE FOR COVERING LACING HOOK HEADS WITH PLASTIC MATERIAL.
No. 536,182. Patented Mar. 26, 1895.
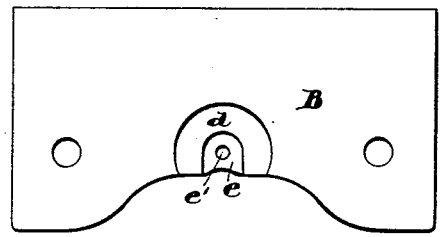
Fig. 5.
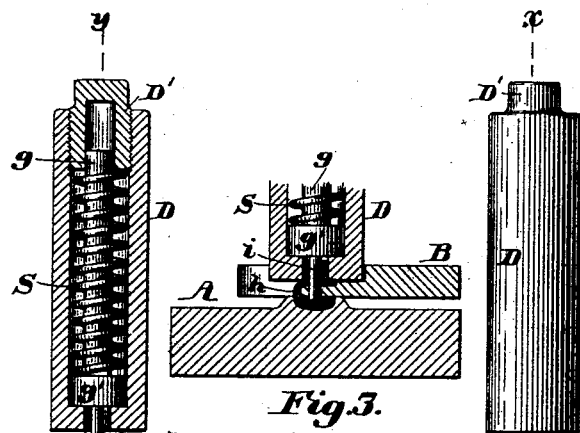
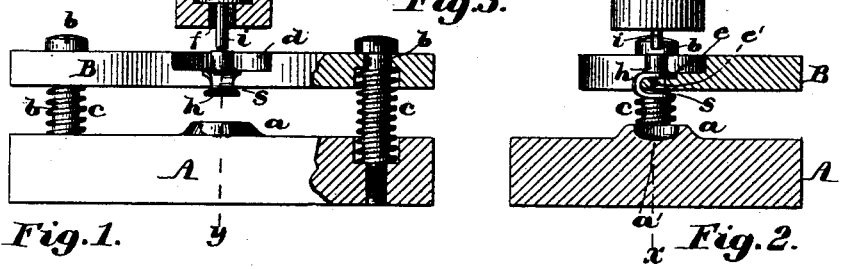
Fig. 1. Fig. 3. Fig. 2.
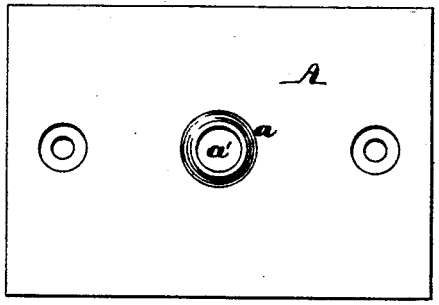
Fig. 4.
Witnesses:
Walter E. Lombard.
Geo. A. Sewall.
Inventor:
Mellen Bray,
by N. C. Lombard
Attorney.

UNITED STATES PATENT OFFICE.

MELLEN BRAY, OF NEWTON, MASSACHUSETTS.

DIE FOR COVERING LACING-HOOK HEADS WITH PLASTIC MATERIAL.

SPECIFICATION forming part of Letters Patent No. 536,182, dated March 26, 1895.

Application filed January 25, 1895. Serial No. 536,166. (No model.)

*To all whom it may concern:*

Be it known that I, MELLEN BRAY, of Newton, in the county of Middlesex and State of Massachusetts, have invented certain new and useful Improvements in Dies for Covering Lacing-Hook Heads with Plastic Material, of which the following, taken in connection with the accompanying drawings, is a specification.

My invention relates to dies for covering lacing hook heads with plastic material and it consists in certain novel features of construction, arrangement and combination of parts which will be readily understood by reference to the description of the accompanying drawings and to the claims hereto appended and in which my invention is clearly pointed out.

Figure 1 of the drawings is a sectional elevation of a die embodying my invention the cutting plane being on line $x, x$, of Fig. 2. Fig. 2 is a sectional elevation the cutting plane being on line $y, y$, of Fig. 1. Fig. 3 is a partial vertical section showing the parts in the positions they occupy when pressure has been applied to the plunger and the plastic material has been molded to the desired form and secured upon the head of the hook. Fig. 4 is a plan of the bed plate with the shaping mold formed therein, and Fig. 5 is a plan of the hook holding plate. Figs. 1 and 2 show the parts in position for inserting a wafer or small disk of the plastic material in the shaping die the lacing hook to be covered being in position upon the hook holding plate.

In the drawings A is the bed plate having formed on its upper side an upwardly projecting hub $a$ in the center of which is formed the recessed forming mold $a'$ and having set therein the two headed screw studs $b, b$, upon which is mounted the plate B which is pressed upward against the heads of said studs by the springs $c, c$, surrounding said studs between the plates A and B as shown.

The plate B has its front edge curved as shown and has formed in its upper surface a recess $d$ to receive the lower end of the plunger and the smaller recess $e$, sunk below the bottom of the recess $d$ to a depth just equal to the thickness of the flange of the eyelet portion of the lacing hook $h$ to be operated upon, and also with the perforation $e'$.

The plate B has a thickness beneath the recess $e$ somewhat less than the distance between the inner face of the hook head and the opposing face of the eyelet flange of the hook as shown in Figs. 1 and 2.

D is a plunger for depressing the plate B which may be mounted in a suitable bearing not shown, and be reciprocated vertically in any well known manner. The plunger is preferably made tubular with an opening $f$ in its lower end adapted to receive the eyelet like shank of the hook $h$, and a considerably larger cylindrical bore in its upper portion with a screw plug D' in its upper end as shown.

Within the bore of the plunger D is fitted the spindle $g$ provided with the collar $g'$ to fit the larger bore of said plunger and having a bearing at its upper end in the bore of the screw plug D' and is surrounded by the spring S between the collar $g'$ and the plug D' to press said spindle downward, and permit it to yield to accommodate itself to variations in the hooks. The spindle $g$ has formed upon, or set in its lower end, the stud $i$ of a size adapted to pass freely through the bore of shank of the lacing hook $h$ and of such a length that when the lower end of the plunger D comes in contact with the bottom of the recess $d$ the end of the stud $i$ will be in contact with the inner face of the head of the hook $h$ as shown in Fig. 3.

The operation of my invention is as follows: The several parts of the apparatus being in the relative positions shown in Figs. 1 and 2 and the plate A being heated to the desired temperature by any suitable heating apparatus, not shown, a thin wafer or disk of pyroxyline or other similar material capable of being softened and rendered plastic by heat is placed in the mold recess $a'$. The hook to be covered is slipped upon the thin edge of the plate B with the flanged end of the shank resting in the recess $e$ and the tubular shank projecting upward and the inner surface of the head of the hook a short distance say about one sixty-fourth of an inch below the lower surface of the plate B as shown at $s$ in Figs. 1 and 2. The plunger D is then moved downward till its lower end comes in contact with the plate B and with the flange of the hook shank or eyelet, and the lower end of the stud or pin $i$ is in contact with the inner face of the hook head when the plate B and the hook *h* are moved downward with sufficient force to embed the hook head in the plastic material and force a portion of said material around the edge of said head and into the space *s* between said head and the under side of the plate B so as to cover the entire inner surface of said head except that portion thereof which is in contact with the stud or pin *i*. The downward movement of the plate B is limited by coming in contact with the raised rim of the hub *a*, when the pressure upon the plunger D is removed and raised to the position shown in Figs 1 and 2, and the plate B is moved upward into contact with the heads of the studs *b, b*, by the reaction of the springs *c, c*, thus removing the hook head from the mold when the hook may be removed and another placed in its place on the plate B and the operation may be repeated.

What I claim as new, and desire to secure by Letters Patent of the United States, is—

1. In a die for covering the heads of lacing hooks with plastic material the combination of a bed die plate having formed in its upper surface a sunken mold for receiving and shaping the plastic covering; a vertically movable plate constructed and arranged to receive the lacing hook to be covered with its tubular shank above and the hook head below and removed from contact with said plate; a perforation in said movable plate in position to be in axial line with the hook shank when placed thereon a reciprocating plunger constructed and arranged to act upon said movable plate to depress it; springs for raising said plate; and a stud or pin carried by said plunger and arranged to pass through the tubular shank of the hook and the hole in said movable plate and bear upon the inner face of the hook head when the end of said plunger bears upon said movable plate.

2. In an apparatus for covering the heads of lacing hooks, the combination of a bed die plate having a sunken mold formed therein; fixed guide studs set therein; a vertically movable plate mounted on said studs and constructed and arranged to receive and support the hook to be covered with the flange of its tubular shank resting thereon and with its head below and removed from contact with said plate; springs for holding said movable plate in its normal or raised position; a reciprocating tubular plunger constructed and arranged to act upon and depress said movable plate and inclose the tubular shank of the hook; a perforation through said movable plate; a spindle carried by said plunger and having a stud or pin constructed and arranged to descend with said plunger and pass through the shank of the hook and the hole in said movable plate, and to bear upon the inner face of the hook head; and spring to press said spindle downward and allow it to yield substantially as described.

In testimony whereof I have signed my name to this specification, in the presence of two subscribing witnesses, on this 24th day of January, A. D. 1895.

MELLEN BRAY.

Witnesses:
N. C. LOMBARD,
WALTER E. LOMBARD.